Jan. 17, 1956     L. W. PHILLIPS ET AL     2,731,030
OVERFLOW FLOAT VALVES
Filed Aug. 31, 1954     2 Sheets-Sheet 1

INVENTORS
LYMAN W. PHILLIPS,
BY GODFREY H. FOX &
WILLIAM L. BOSTWICK.

Everett G. Wright
ATTORNEY

Jan. 17, 1956   L. W. PHILLIPS ET AL   2,731,030
OVERFLOW FLOAT VALVES

Filed Aug. 31, 1954   2 Sheets-Sheet 2

INVENTORS
LYMAN W. PHILLIPS,
BY GODFREY H. FOX &
WILLIAM L. BOSTWICK.
ATTORNEY

United States Patent Office 2,731,030
Patented Jan. 17, 1956

2,731,030

OVERFLOW FLOAT VALVES

Lyman W. Phillips and Godfrey H. Fox, Detroit, and William L. Bostwick, Pleasant Ridge, Mich., assignors to Petroleum Systems, Inc., a corporation of Michigan Application August 31, 1954, Serial No. 453,344

3 Claims. (Cl. 137—413)

This invention relates to float valves and in particular to overflow float valves of the type employed to shut off the flow of fluid under pressure entering a tank through the tank filler nozzle.

The primary object of the invention is to provide an improved overflow float valve particularly suitable for use in preventing the overfilling of petroleum and other fluid storage tanks that are filled by pumping fluids thereinto under pressure, which valve is both positive and smooth in operation under all filling conditions, and which may be mounted on, installed in, and serviced through the tank filler nozzle generally employed on storage tanks.

Another object of the invention is to provide an improved overflow float valve wherein the float alone effects all but the final stage of the closing of the valve which is finally closed and held closed responsive to pressure of fluid being pumped into a tank equipped therewith after the fluid in the tank attains a predetermined level, and wherein the float alone effects the opening of the valve.

Another object of the invention is to provide in an overflow tank type float valve a main valve, a pilot valve and a pressure control chamber so arranged and interconnected that the main valve is maintained in hydraulic balance during all but the final portion of its closing cycle to provide a smooth, shock-free closure, regardless of the magnitude of the fluid pressure or the velocity of the fluid passing through the valve during the filling of the tank.

A further object of the invention is to provide an overflow float valve including a main valve, a pressure control chamber, and a pilot valve communicating with said pressure chamber, the said pilot valve having a pressure bleed-off port therein to permit the bleeding-off of pressure in the fill line to the float valve at the tank filler nozzle whereby to prevent the overflow float valve from being pressure locked in its closed position after the tank is filled and the fill line to tank float valve has been valved off, thus providing thermal expansion relief for liquid trapped in the closed fill line.

Still another object of the invention is to provide an overflow float tank valve for tanks that are filled by pumping fluid under pressure thereinto including a pressure balanced main valve and an auxiliary valve adapted to unbalance the main valve at the final float closing thereof to pressure seal the main valve in its closed position, which main valve is pressure bled through the pilot valve to permit the main valve to be float opened responsive only to fluid being withdrawn from the tank.

Other objects of the invention will become apparent by reference to the following detailed description taken in connection with the accompanying drawings, in which.

Figure 1:
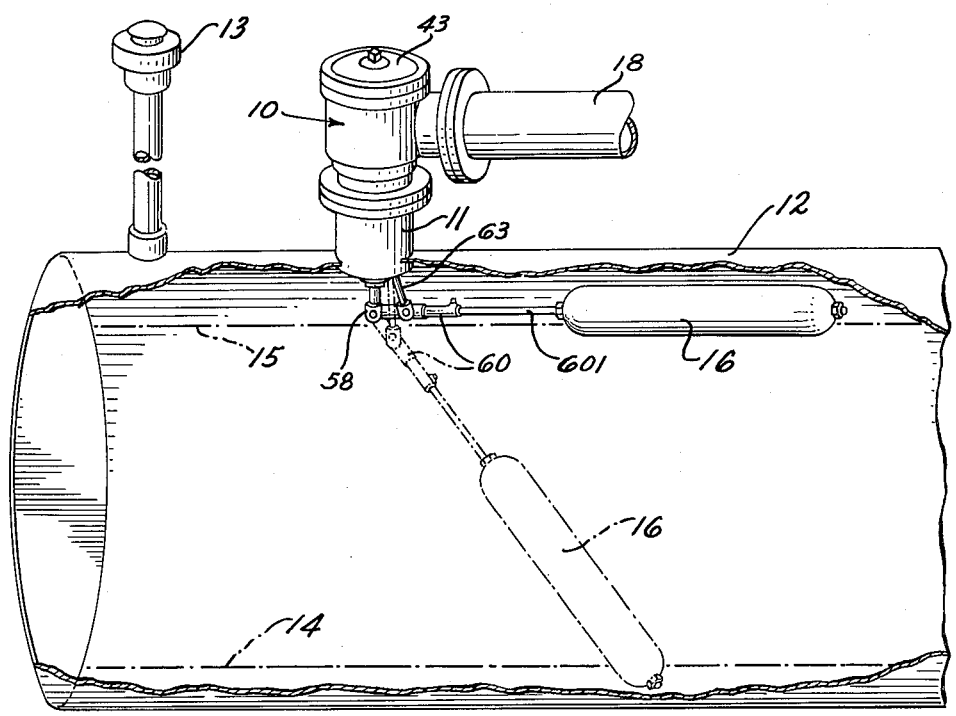
Fig. 1 is a fragmentary sectional view of a tank equipped with an overflow tank valve of the type incorporating the invention.

Referring now to the drawing wherein like reference numerals refer to like and corresponding parts throughout the several views, Fig. 1 shows an overflow float valve 10 embodying the invention mounted on and installed through the tank filler nozzle 11 of a tank 12, the said tank 12 being equipped with a suitable vent 13 to prevent pressure from building up within the tank either during the pumping of the petroleum or other fluid thereinto or as a result of thermal expansion of the contents of the tank. The dot and dash lines 14 and 15 show respectively the low fluid level and the full fluid level of the tank's contents. The valve float 16 is shown in full lines representing its position when the tank is full and the overflow float valve 10 is closed. The said float 16 is also shown in dot and dash lines indicating the position assumed by it when the float valve 10 is fully open.

Figure 2:
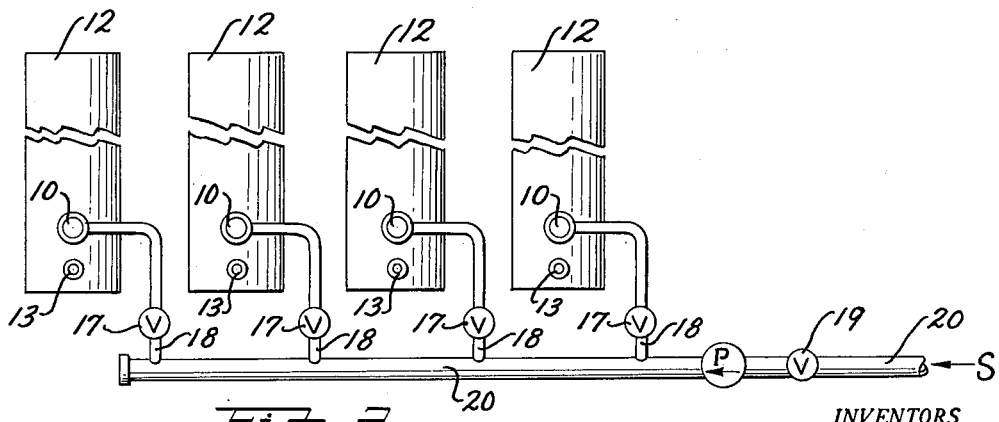
Fig. 2 is a more or less diagrammatic view of a tank farm showing a typical installation of overflow tank valves employed to prevent accidental overfilling of the tanks.

A typical tank farm is shown diagrammatically in Fig. 2 in which is indicated the piping and valving generally employed in pumping fluid to be stored from a fluid source S to a plurality of storage tanks 12 protected by overflow float valves 10 embodying the invention. A manual shut-off valve 17 is preferably provided in the branch pressure supply line 18 to each tank, and a master shut-off valve 19 is placed in the main pipe line 20 between the fluid source S and the pump P. The fluid source S, for example, may be a tank car or a tanker, or, it may be a pipe line from process equipment in a chemical plant or elsewhere.

Figure 3:
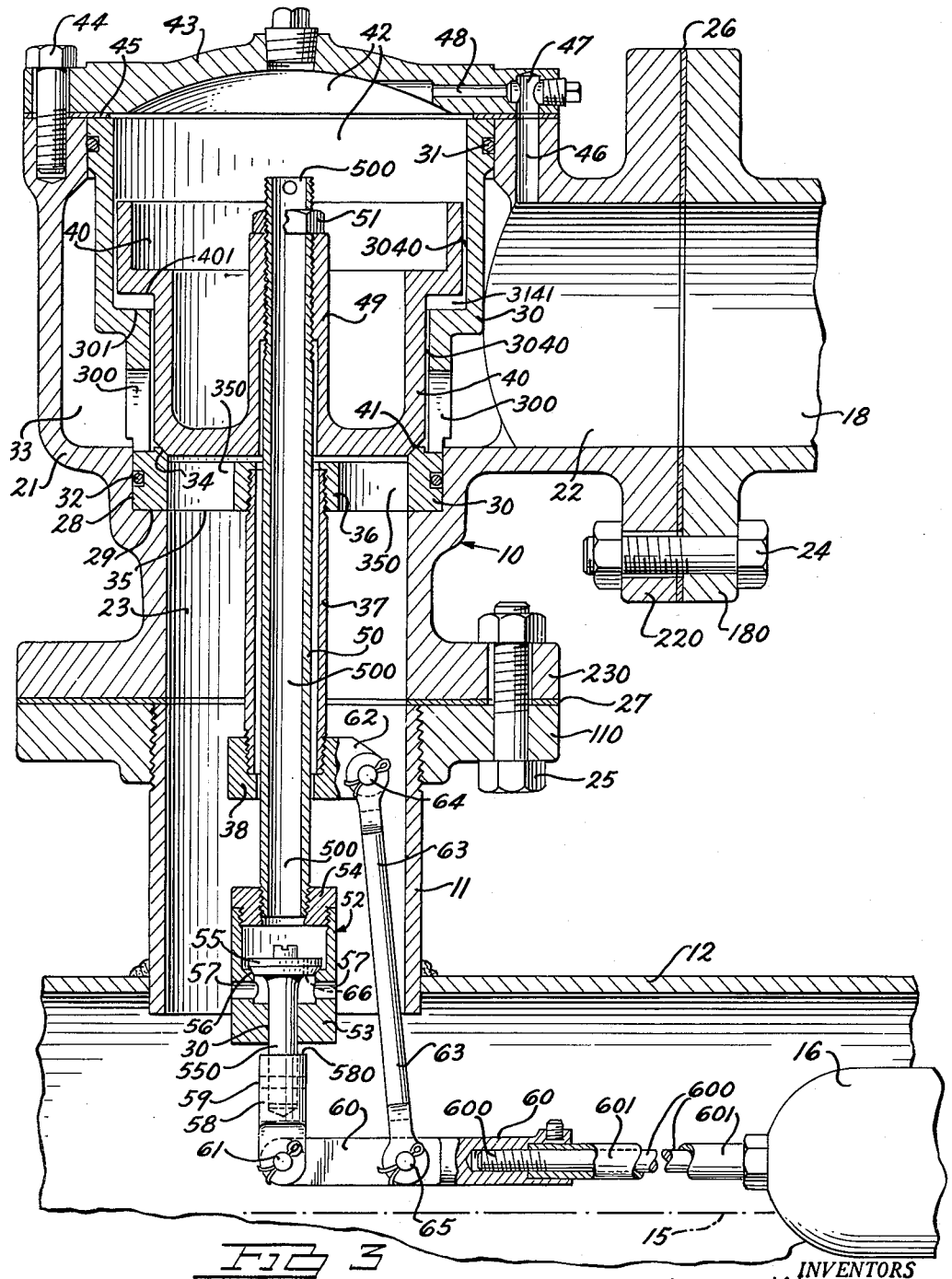
Fig. 3 is an enlarged detailed vertical sectional view through an overflow tank valve embodying the invention.

The overflow tank valve 10 illustrating the invention is shown in detail in Fig. 3. The said overflow tank valve 10 has a body 21 provided with a flanged inlet 22 and a flanged outlet 23 angularly disposed in respect to each other, the flanges 220 and 230 thereof being connected by means of bolts 24 and 25 to the flange 180 of the inlet pipe 18 and the flange 110 of the tank filler nozzle 11, respectively. Gaskets 26 and 27 at the said inlet and outlet connections assure a fluid-tight joint thereat. Such construction provides a horizontal inlet 22 to the valve body 21 and a vertical outlet 23 therefrom, the said outlet 23 being in alignment with the tank filler nozzle 10 to accommodate valve mechanism as hereinafter described.

The body 21 is somewhat larger in diameter than the outlet 23 therefrom and is bored at 28 to provide an annular seat 29 to receive and support a cup shaped valve guide and valve seat element 30 disposed concentrically in respect to the said outlet 23, the said valve guide and seat element 30 extending to the top of the body 21. O-rings 31 and 32 disposed in suitable circumferential grooves near the top and bottom of the valve guide and seat element 30 provide fluid-tight seals between the upper and lower peripheries of the said valve guide and seat element 30 and the inner periphery of the body 21 near the top and bottom thereof, thus providing an annular inlet passage 33 within the body 21 surrounding the valve guide and seat element 30 and communicating with the body inlet 22.

The valve guide and seat element 30 is provided with an inner and upwardly facing annular beveled seat 34 elevated somewhat above the bottom thereof. The bottom of the valve guide and seat element 30 is formed into a spider 35 having a central hub 36 and fluid passages 350 therethrough. The said central hub 36 is bore and threaded to receive and support in depending relationship therefrom a tubular valve rod sleeve 37 which has a valve rod guide collar 38 threaded on the lower end thereof.

The lower portion of the peripheral walls of the valve guide and seat element 30 is provided with a plurality of apertures 300 therein providing primary communicating passages between the annular inlet passage 33 and the outlet passage 23 through the spider apertures 350, which primary communicating passages are closed off by a main cup shaped valve element 40 reciprocatingly mounted in the annular valve guide and seat element 30. The said main cup shaped valve element 40 has an annular outwardly and downwardly facing beveled seat 41 at the bottom thereof which seats on the beveled seat 34 of the annular valve guide and seat element 30 when the valve is closed.

The upper end of the valve seat and guide element 30 and the upper end of the main cup shaped valve element 40 are outwardly offset to provide a relatively large pressure chamber 42 above the main cup shaped valve element 40. The valve body 21 and the valve guide and valve seat element 30 are both covered by a fluid-tight valve bonnet 43 secured by studs 44 to the top of the valve body 21. A gasket 45 between the tops of the valve body 21 and the valve guide and seat element 30 and the bottom of the valve bonnet 43 assures a fluid-tight seal therebetween. Bores 46 in the valve body 21 and 47 and 48 in the valve bonnet 43 provide a secondary passage or communication between the valve inlet 22 and the pressure chamber 42. Generous clearance 3040 between the inner periphery of the valve guide and seat element 30 and the outer periphery of the main cup shaped valve element 40 provides a further communication or tertiary passage between the valve inlet 22 and the pressure chamber 42, and at the same time assures substantially friction free movement of the main cup shaped valve element 40 within the valve guide and seat element 30.

By reference to Fig. 3, it will be noted that the valve guide 30 and the main valve element 40 are provided with oppositely disposed annular shoulders 301 and 401 forming an annular fluid chamber 3141 therebetween, the said fluid chamber 3141 increases in capacity when the main valve element 40 rises off its seat and becomes restricted in capacity as the main valve element 40 moves toward its seat. The annular fluid chamber 3141 is constantly filled with fluid passing through the tertiary passage 3040. The passage of fluid into and out of the said fluid chamber 3141 as the main valve 40 opens and closes serves to prevent main valve hammering at the final closing thereof and to prevent fluttering at all stages of its operation.

The main cup shaped valve element 40 has an upwardly disposed central stem 49 which is axially bored and threaded to receive and support in depending relationship therefrom a tubular valve rod 50 which is telescoped through the valve rod sleeve 37 and the valve rod guide collar 38 at the lower end thereof. A lock nut 51 threaded on the upper end of the tubular valve rod 50 against the top of the central stem 49 of the main valve element 40 serves to fix the tubular valve rod 50 in the depending position to which it may be adjusted. The lower end of the tubular valve rod 50 has an auxiliary valve 52 fixed thereon which moves upwardly and downwardly with the main cup shaped valve element 40 as it is unseated and seated respectively as hereinafter described.

The auxiliary valve 52 has a cup shaped housing 53 capped by a suitable cap 54 with which the tubular valve rod 50 is threaded. Thus, a fluid passage 500 is provided through the tubular valve rod 50 extending from the pressure chamber 42 into the housing 53 of the auxiliary valve 52. A poppet type valve element 55 having a stem 550 reciprocatingly mounted through a central aperture 530 in the bottom of the valve housing 53 seats on an annular valve seat 56 formed in the cup shaped auxiliary valve housing 53. Below the said annular valve seat 56 are outlet ports 57 through which fluid may pass when the auxiliary valve 52 is open, the fluid discharging into the tank filler nozzle 11 and tank 12.

A sleeve fitting 58 is fixed onto the lower end of the stem 550 of the auxiliary valve element 55 by such means as a pin or rivet 59, the lower end of the said sleeve fitting 58 having a float arm 60 pin connected thereto by a suitable pivot pin 61. The outer end of the float arm 60 is bored, counterbored and interiorly threaded to receive and support in cantilever relationship a float arm extension 600 and float arm extension sleeve 601, both of which extend from the inner end of the float 16. This construction permits the mounting of the float 16 at any desired distance from the pivot 61.

The valve rod guide collar 38 fixed on the lower end of the valve rod sleeve 37 has an ear 62 extending therefrom to which is pin connected the upper end of a swinging lever 63 by a pivot pin 64, the lower end of the said swinging lever 63 being pin connected to the float arm 60 by a pivot pin 65 located outwardly from the pivot pin 61 which connects the said float arm 60 to the stem 550 of the auxiliary valve element 55 through the sleeve fitting 58.

It will be noted that the top 580 of the sleeve fitting 58 is spaced slightly below the bottom of the auxiliary valve housing 53 so that, when the float arm 60 pivots about the pivot 65 at the lower end of the swinging lever 63 as the float 16 pivots downwardly from its "full" position shown in Fig. 3, the auxiliary valve element 55 is first lifted from its seat 56, then, as the float 16 continues to pivot downwardly about the pivot 65, the top 580 of the sleeve fitting 58 contacts the bottom of the housing 53 of the auxiliary valve 52 and lifts and opens the main valve 40 connected thereto by the tubular valve rod 50. When the float arm 60 pivots about the pivot 65 at the lower end of the swinging lever 63 as above described, the swinging lever 63 swings inwardly about its supporting pivot 64 at the upper end thereof toward the pivot 61 which moves simultaneously upwardly to open sequentially the auxiliary valve 52 and the main valve 40.

When the tank 12 is empty, the float 16 assumes the position indicated by the dot and dash lines in Fig. 2. In this position, the float arm 60 has been pivoted clockwise around the pivot pin 65 as viewed in Fig. 3 opening the auxiliary valve 52 and the main valve 40 causing each to be lifted sequentially from their seats 56 and 34 respectively. When fully opened, the top of the main valve 40 abuts against the bonnet 43 which serves as a stop therefor, and the overflow float valve assembly 10 is ready to admit to the tank 12 fluid under pressure pumped thereto from the source S through the main pipe line 20 and the branch pressure supply line 18.

As the tank 12 is being filled, the primary flow of fluid enters the overflow tank valve 10 through the inlet 22, then passes through the annular inlet passage 33 in the valve body 21 to and through the ports 300 of the valve guide and seat element 30 into the tank nozzle 11, and from the tank nozzle 11 the said fluid discharges under pressure into the tank 12. Simultaneously, a secondary flow of fluid passes from the inlet 22 through the bores 46, 47 and 48, fills up the main cup shaped valve element 40, and flows into the pressure chamber 42 from whence it overflows into the fluid passage 500 of the tubular valve rod 50. The fluid passage 500 carries the said secondary flow of fluid into the housing 53 of the auxiliary valve 52, and through the outlet ports 57 thereof into the tank nozzle 11 and tank 12. As the tank 12 is being filled, a tertiary flow of fluid occurs from the inlet 22 through the annular inlet passage 33 and between the outer wall of the main cup shaped valve element 40 and the inner wall of the valve guide and seat element 30 to the pressure chamber 42 from whence it passes into the tank 12 via the same route taken by the secondary flow hereinabove described.

Fluid entering the tank under pressure via the primary flow of fluid through the overflow float valve 10 creates a pressure on the underside of the main valve 40 tending to urge it fully upward against the bonnet 43. A portion of the fluid entering the valve under this same pressure enters the pressure chamber 42 above the main valve 40 and below the bonnet 43 through the secondary and tertiary flows described above, and, because of the relatively larger area of the fluid passage 500 and the outlet ports 57 of the auxiliary valve 52 as compared to the area of the secondary and tertiary inlet to the pressure chamber 42, fluid entering the pressure chamber 42 will discharge therefrom faster than it enters, thereby preventing pressures from building up within the pressure chamber and allowing the pressure of fluid entering the tank via the primary flow route to maintain the main valve element 40 open.

As the fluid level in the tank 12 raises, the float 16 raises causing the auxiliary valve 52 to start to close. As the valve element 55 of the auxiliary valve 52 approaches its seat, the flow of fluid from the pressure chamber 42 through the fluid passage 500 and the auxiliary valve 52 becomes gradually restricted, and, as a result, pressure is gradually built up in the pressure chamber 42 on top of the main valve 40 sufficient to overcome the pressure built up on the bottom thereof due to fluid passing thereunder, and the main valve 40 leaves its full open position and closes to the extent the auxiliary valve is closed by the float 16.

When the float 16 reaches its "full" position, the main valve 40 closes; however, the secondary and tertiary flow continues momentarily through the auxiliary valve 52, and as a result of the closure of the main valve 40, pressure within the pressure chamber 42 increases rapidly and quickly shuts the auxiliary valve 52.

So long as fluid under pressure is pumped to the tank 12, both the main valve 40 and the auxiliary valve 52 remain closed; the higher the pressure the tighter the main and auxiliary valves become seated. When the pump P is stopped, the pressure within the fill lines 18 and 20 to the tank 12 is bled off through a bleed-off port 66 provided through the valve element 55 of the auxiliary valve 52 whereupon the auxiliary valve 52 will crack open. All line pressure in the fill line to the tank 12 is thus relieved through the auxiliary valve 52 and the tank vent 13, and the valve mechanism is ready to return to a partially or fully open position responsive to action of the float 16 according to the level of the fluid in the tank 12.

Although but one embodiment of the invention has been disclosed and described in detail, it is obvious that many changes may be made in the size, shape, arrangement and detail of the various elements of the invention without departing from the spirit and scope thereof as defined by the appended claims.

We claim:

1. An overflow float valve of the type adapted to shut off fluid being supplied therethrough under pressure to a closed tank including a tank filler nozzle responsive to the fluid in the tank attaining a predetermined level comprising an L-shaped valve body mounted on the tank filler nozzle having a horizontal inlet thereto from a pressure fluid supply line and a vertical outlet therefrom communicating with said tank filler nozzle, a valve guide and valve seat element fixed in vertical relationship within said valve body with an annular primary inlet passage therearound communicating between said inlet and said outlet, a cup shaped main valve element reciprocatingly mounted in said valve guide and valve seat element adapted to seat and close off communication between said annular primary inlet passage and said outlet, the said valve guide and main valve element being provided with oppositely disposed annular shoulders forming an annular fluid chamber therebetween, the said cup shaped valve element forming a pressure chamber in said valve body thereabove, an auxiliary valve suspended from said main valve with a communicating passage from said pressure chamber to said auxiliary valve, said auxiliary valve having an outlet therefrom communicating with said tank, said L-shaped valve body having a continuously open secondary passage communicating between said inlet and said pressure chamber, the said valve guide and main valve element being generously spaced to provide a continuously open tertiary passage communicating between said inlet, said annular fluid chamber and said pressure chamber, the communicating passage between said main valve and said auxiliary valve and the outlet therefrom being larger than the combined secondary and tertiary passages, a float pivotally suspended from said valve guide and valve seat element linked to said auxiliary valve maintaining said main and auxiliary valves open during the filling of the said tank, said float closing said auxiliary valve sufficiently as it closes said main and auxiliary valves to reduce the auxiliary valve outlet to less area than the area of said secondary and tertiary passages causing a pressure to be built up on said main valve to finally close the same hydraulically, the said annular fluid chamber serving to prevent main valve hammering at final closing thereof and to prevent flutter at all stages of its operation.

2. An overflow float valve as claimed in claim 1 wherein the valve guide and seat element is removably fixed in fluid tight relationship within the valve body, wherein the top of the valve body is apertured and provided with a removable fluid tight bonnet, and wherein the entire main and auxiliary valve mechanism and the float thereof is arranged for removal through said top valve body aperture.

3. An overflow float valve as claimed in claim 1 wherein the auxiliary valve has a pressure relief bleed therethrough whereby to relieve pressure that may be built up on the main valve after fluid being supplied to the tank is shut off ahead of the overflow valve.

References Cited in the file of this patent

UNITED STATES PATENTS 1,397,591    Lauritsen _____ Nov. 22, 1921